United States Patent
Gutshall et al.

(10) Patent No.: US 10,995,865 B2
(45) Date of Patent: May 4, 2021

(54) PISTON BALL GUIDE FOR A BALL PUMP

(71) Applicant: Graco Minnesota Inc., Minneapolis, MN (US)

(72) Inventors: Evan M Gutshall, North Canton, OH (US); Ralph C Angiuli, Canfield, OH (US); Kevin M Raines, Akron, OH (US); John R Scopelite, Louisville, OH (US); Charles J Wheeler, New Philadelphia, OH (US)

(73) Assignee: Graco Minnesota Inc., Minneapolis, MN (US)

( * ) Notice: Subject to any disclaimer, the term of this patent is extended or adjusted under 35 U.S.C. 154(b) by 255 days.

(21) Appl. No.: 15/767,809

(22) PCT Filed: Nov. 10, 2016

(86) PCT No.: PCT/US2016/061296
§ 371 (c)(1),
(2) Date: Apr. 12, 2018

(87) PCT Pub. No.: WO2017/083500
PCT Pub. Date: May 18, 2017

(65) Prior Publication Data
US 2018/0298895 A1    Oct. 18, 2018

Related U.S. Application Data

(60) Provisional application No. 62/255,848, filed on Nov. 16, 2015, provisional application No. 62/255,749, (Continued)

(51) Int. Cl.
*F16K 15/04* (2006.01)
*F04B 53/12* (2006.01)
(Continued)

(52) U.S. Cl.
CPC ............ *F16K 15/048* (2013.01); *F04B 15/02* (2013.01); *F04B 19/22* (2013.01);
(Continued)

(58) Field of Classification Search
CPC ...... F16K 15/048; F16K 15/183; F16K 15/04; F04B 15/02; F04B 53/1007;
(Continued)

(56) References Cited

U.S. PATENT DOCUMENTS 1,430,986 A    10/1922  Hallman
1,513,985 A *  11/1924  Gunn ................. F16K 15/04
                                                 137/533.13

(Continued)

FOREIGN PATENT DOCUMENTS

CA    2122694 C    5/1997
CH    597513 A5    4/1978
(Continued)

OTHER PUBLICATIONS

First Chinese Office Action for Chinese Patent Application No. 201680065764.6, dated Apr. 24, 2019, 9 pages.
(Continued)

*Primary Examiner* — Peter J Bertheaud
*Assistant Examiner* — Geoffrey S Lee
(74) *Attorney, Agent, or Firm* — Kinney & Lange, P.A.

(57) ABSTRACT

A disclosure pertains to a reciprocating pump configured for pumping fillers or aggregates or cementitious material and the like.

15 Claims, 9 Drawing Sheets

Related U.S. Application Data filed on Nov. 16, 2015, provisional application No. 62/253,733, filed on Nov. 11, 2015.

(51) Int. Cl.
*F04B 19/22* (2006.01)
*F04B 53/10* (2006.01)
*F04B 15/02* (2006.01)
*F16K 15/18* (2006.01)

(52) U.S. Cl.
CPC ...... *F04B 53/1007* (2013.01); *F04B 53/1087* (2013.01); *F04B 53/126* (2013.01); *F04B 53/101* (2013.01); *F16K 15/04* (2013.01); *F16K 15/183* (2013.01)

(58) Field of Classification Search
CPC .... F04B 53/1087; F04B 19/22; F04B 53/126; F04B 53/101; Y10T 137/7914; Y10T 137/791
USPC ......................................................... 417/554
See application file for complete search history.

(56) References Cited

U.S. PATENT DOCUMENTS

| | | | |
|---|---|---|---|
| 1,543,179 A * | 6/1925 | Miller | F04B 53/04 166/334.3 |
| 1,714,398 A | 5/1929 | Bannon | |
| 1,714,434 A | 5/1929 | Bannon | |
| 1,931,938 A | 10/1933 | Pippin | |
| 2,007,888 A | 7/1935 | Ball | |
| 2,061,480 A | 11/1936 | Pigott | |
| 2,274,968 A | 3/1942 | Bannon | |
| 2,309,839 A | 2/1943 | Gardner | |
| 2,362,139 A | 11/1944 | Kelly | |
| 2,682,281 A * | 6/1954 | Ecker | F16K 15/04 137/533.13 |
| 2,723,679 A | 11/1955 | Harris et al. | |
| 2,734,667 A | 2/1956 | Conklin | |
| 3,050,002 A | 8/1962 | Harris | |
| 3,059,667 A | 10/1962 | Coceano | |
| 3,077,204 A | 2/1963 | Bennett et al. | |
| 3,146,618 A | 9/1964 | Szuster | |
| 3,263,239 A | 8/1966 | Edwards et al. | |
| 3,295,822 A | 1/1967 | Bannon, Jr. et al. | |
| 3,371,352 A | 3/1968 | Siposs et al. | |
| 3,387,625 A | 6/1968 | Laure | |
| 3,542,155 A | 11/1970 | Kern | |
| 3,543,682 A | 12/1970 | Farrow | |
| 3,620,228 A | 11/1971 | Schmid | |
| 3,637,328 A | 1/1972 | Kurokawa et al. | |
| 3,661,167 A | 5/1972 | Hussey | |
| 3,724,496 A | 4/1973 | Secrist | |
| 3,749,521 A | 7/1973 | Coone | |
| 3,896,723 A | 7/1975 | Farrow et al. | |
| 3,911,502 A | 10/1975 | Boretos | |
| 4,061,085 A | 12/1977 | Farrow | |
| 4,286,622 A | 9/1981 | Ninomiya et al. | |
| 4,287,912 A | 9/1981 | Hewett | |
| 4,291,763 A | 9/1981 | Singer | |
| 4,295,412 A | 10/1981 | Hachiro | |
| 4,611,374 A | 9/1986 | Schnelle et al. | |
| 4,667,696 A | 5/1987 | van Rensburg | |
| 4,846,213 A | 7/1989 | Hutchens et al. | |
| 4,955,407 A | 9/1990 | Inoue | |
| 5,061,159 A * | 10/1991 | Pryor | F04B 53/1002 417/454 |
| 5,139,047 A | 8/1992 | Reinicke | |
| 5,178,184 A | 1/1993 | Skillman | |
| 5,232,014 A | 8/1993 | Hiltebrand | |
| 5,245,962 A | 9/1993 | Routery | |
| 5,395,219 A | 3/1995 | Hosoya et al. | |
| 5,435,697 A | 7/1995 | Guebeli et al. | |
| 5,567,135 A | 10/1996 | Mueller et al. | |
| 5,577,896 A | 11/1996 | Harada | |
| 5,593,289 A | 1/1997 | Tarpley | |
| 5,593,292 A | 1/1997 | Ivey | |
| 5,649,360 A | 7/1997 | Schwarz | |
| 5,653,258 A | 8/1997 | Schwarz | |
| 5,785,083 A * | 7/1998 | Tang | F16K 15/04 137/533.13 |
| 5,971,015 A | 10/1999 | Gonsior | |
| 5,980,224 A | 11/1999 | Regueiro | |
| 5,988,994 A | 11/1999 | Berchowitz | |
| 6,029,685 A | 2/2000 | Carruth | |
| 6,155,806 A | 12/2000 | Andel | |
| 6,267,137 B1 | 7/2001 | Watanabe et al. | |
| 6,398,317 B1 | 6/2002 | Burgdorf et al. | |
| 6,679,684 B2 | 1/2004 | Kominami | |
| 6,685,451 B1 | 2/2004 | Ivey | |
| 6,764,286 B2 | 7/2004 | Hunnicutt et al. | |
| 6,830,441 B1 | 12/2004 | Williams | |
| 7,028,647 B2 | 4/2006 | Styron | |
| 7,444,990 B1 | 11/2008 | Fisher et al. | |
| 8,146,618 B2 | 4/2012 | Szuster | |
| 8,251,066 B1 | 8/2012 | Ho et al. | |
| 8,579,610 B2 | 11/2013 | Perkins, Jr. et al. | |
| 8,794,938 B2 | 8/2014 | Frey | |
| 9,140,245 B2 | 9/2015 | Nakai et al. | |
| 9,394,900 B2 | 7/2016 | Roman et al. | |
| 10,100,829 B2 * | 10/2018 | Ford | E21B 34/08 |
| 2004/0120838 A1* | 6/2004 | Savidge | F04B 39/1006 417/559 |
| 2005/0121084 A1 | 6/2005 | Andersson | |
| 2005/0257927 A1* | 11/2005 | Coyes | F04B 47/02 166/108 |
| 2006/0188380 A1* | 8/2006 | Strong | F04B 53/126 417/555.1 |
| 2010/0206404 A1 | 8/2010 | Morrison et al. | |
| 2010/0269928 A1* | 10/2010 | Ford | F16K 15/04 137/533.11 |
| 2013/0142684 A1 | 6/2013 | Asou | |
| 2014/0026987 A1 | 1/2014 | Ayers et al. | |
| 2015/0059882 A1 | 3/2015 | Kraus et al. | |
| 2015/0292492 A1* | 10/2015 | Kim | F04B 1/0452 417/505 |
| 2016/0069344 A1* | 3/2016 | Carey | F04B 53/1007 417/213 |
| 2018/0066652 A1* | 3/2018 | Ford | F04B 53/10 |

FOREIGN PATENT DOCUMENTS

| | | |
|---|---|---|
| CN | 87211361 U | 9/1988 |
| CN | 2048906 U | 12/1989 |
| CN | 2065708 U | 11/1990 |
| CN | 1256377 A | 6/2000 |
| CN | 2811601 Y | 8/2006 |
| JP | 2000035146 A | 2/2000 |
| WO | 2012-149005 A2 | 11/2012 |

OTHER PUBLICATIONS

Extended European Search Report for European Patent Application No. 16864988.7, dated Mar. 19, 2019, 8 pages.
Third Chinese Office Action for Chinese Patent Application No. 2016800657646, dated Jul. 31, 2020, 16 pages.
Third Chinese Office Action for Chinese Patent Application No. 2016800658634, dated Aug. 3, 2020, 17 pages.

* cited by examiner

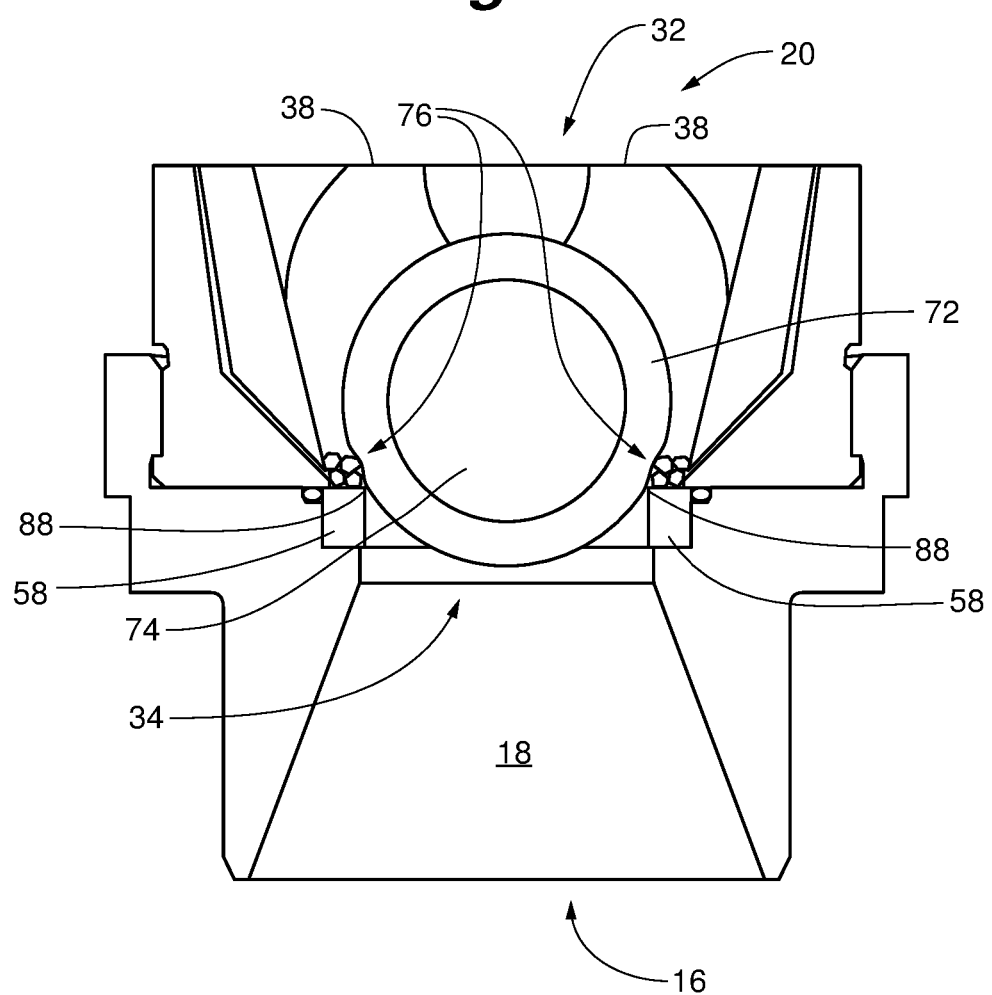

PISTON BALL GUIDE FOR A BALL PUMP

CROSS-REFERENCE TO RELATED APPLICATIONS

This application is a National Stage application under 35 U.S.C. 371 ("371 Application") of International Patent Application No. PCT/US2016/061296 filed Nov. 10, 2016, which claims the benefit of U.S. Provisional Patent Application No. 62/255,848 filed Nov. 16, 2015, U.S. Provisional Patent Application No. 62/255,749 filed Nov. 16, 2015, and U.S. Provisional Patent Application No. 62/253,733 filed Nov. 11, 2015, all of which are herein incorporated by reference in their entirety.

STATEMENT REGARDING FEDERALLY SPONSORED RESEARCH OR DEVELOPMENT

Not applicable.

TECHNICAL FIELD

The instant disclosure pertains to a pump. More particularly, the disclosure pertains to a reciprocating pump for pumping an aggregate.

BACKGROUND

Two ball piston pumps have not traditionally been used for pumping heavy fillers or aggregates or cementitious material and the like. Problems associated with restricted flow passages as well as the inability of ball check valves to seal properly in a heavily aggregate filled material are common. When cementitious material is put under pressure the water or fluid contained within the material can separate out from the aggregate portion of the material which leads to a compressed or hardened mass that is no longer flowable, and it is considered packed out. Packed out material prevents the pump from working. Additionally, pumping heavily filled material requires valves, e.g., check valves, that seal adequately to prevent water or fluid within the material from separating out.

U.S. Pat. No. 2,309,839 to Gardner discloses a float collar utilized in lowering strings of pipe into a well bore using floating equipment. The float collar is made of a deformable rubber body which is inserted into the pipe without performing any operations on the pipe such as threading, welding, etc. After the rubber body is inserted in position, it is arranged to permit its expansion so that the inherent resiliency of the rubber causes it to grip inside of the pipe and hold the pipe in position. Also disclosed is providing a rubber float collar and a rubber float shoe having a body made of resilient material such as rubber and having a diameter substantially in excess of the inside diameter of the string of pipe to which it is applied so that the body may be compressed, inserted in the pipe, and permitted to expand so that its inherent resiliency creates a frictional grip with the inside surface of the pipe to hold the body in position. Additionally, a rubber float collar or guide shoe is disclosed which can be temporarily deformed and retained in such deformed position so that it may be inserted in a pipe to thereafter expand and grip the pipe. The disclosure further provides a rubber float collar which can be deformed and temporarily retained in such deformed position by a restraining means or by means of a wire or metal sleeve which can be thereafter released by corrosion or otherwise so as to release the body.

U.S. Pat. No. 2,682,281 to Ecker relates to ball check valves and, more particularly, a ball valve provided with a cage having a flexible and resilient ball guide. The flexible and resilient ball guide includes circumferentially spaced guide elements adapted to receive the ball valve therebetween, the circumferential spaces between the guide elements providing passages past the ball valve through which fluid may flow when the ball valve is in its open position. Also disclosed is a unitary ball guide wherein the circumferentially spaced guide elements are interconnected so that the ball guide may be readily assembled with, or disassembled from the body of the ball valve cage. The guide elements of the ball guide are interconnected by arcuate connecting elements which co-operate with the guide elements at one end of the ball guide to form an annulus at the one end of the ball guide. To facilitate assembly of the ball guide with the body of the ball valve cage, at least the arcuate connecting elements defining the annulus are formed of a material which is considerably more flexible and softer than the guide elements.

U.S. Pat. No. 2,723,679 to Harris et al. teaches check valves for compressed air lines to regulate and control air pressure tanks, and more specifically a check valve which is preferably vertically positioned in the air line and is so designed and arranged that it will give instant opening and quick cut-off and provide a positive self cleaning action. The valve is useable in air controlled operations where a positive and quick acting check valve is required in the air line between the compressed air tank and the mechanism operated by the air. The check valve is in the form of a ball which is operative within a cage which includes a seat. The valve mechanism itself is mounted and arranged in vertical position, that is the valve mounting portion of the assembly is mounted in a vertical section between two horizontal sections of the entire compressed air line assembly. The guide or cage in which the valve is operable is formed integral with the valve bumper which provides for ease of assembly and replacement. The valve seat is designed for effecting an easy and rigid association with the compressed air line, and in a manner which expedites the removal in a quick and easy way of the seat from the assembly and also affords an easy replacement of a valve seat. The rapid deterioration of the prior art valve and parts thereof caused by foreign matter is overcome by constructing a valve wherein the ball is subjected to a spinning action in its opening and closing movements. The spinning action also causes the ball to be self cleaning to thereby eliminate substantially all corrosion which does form on valves. The air line is of angular construction forming a vertical section between two horizontal sections. The valve mechanism is operatively mounted in the vertical section. When the pressured air is flowing through the system it passes from a horizontal into the vertical section and this angular flow creates air turbulence in the vertical section which lifts the valve and generates a spinning reaction therein. This spinning action is also aided by the construction of the bumper at the top of the ball cage or guide which the ball valve engages at the top of its opening stroke.

U.S. Pat. No. 3,077,204 to Bennett et al. discloses one-way check valves for controlling the flow of fluids and more particularly a check valve suited to controlling the flow of granular fluid materials, such as plaster and cement slurry. The check valve is constructed such that granular particles in the material flowing through the valve cannot prevent the valve from closing completely. Also disclosed is a check valve which is adjustable to vary the distance of travel of its check valve member between open and closed positions so as to adapt the valve to use in a constant delivery plaster and cement spray pump.

U.S. Pat. No. 3,371,352 to Siposs et al. pertains to a heart valve having needle fixation in combination with an upholstered suturable cuff. The needles are pivotally mounted to swing in a common radial plane and have arcuately curved shanks concentric with their pivotal axes to avoid a sweeping motion as they penetrate the patient's tissue. The needles are projected by an epi-cycloidal cam on a rotatable ring in the valve.

U.S. Pat. No. 3,387,625 to Laure discloses a check valve construction having a ball check valve located between a pair of spaced apart annular constricting rings embracing a deformable tubular member forming deformations on the interior thereof, one of the deformations forming a valve seat for the ball valve member. The deformations are capable of being removed from the tubing and moved axially of the tubing.

U.S. Pat. No. 3,542,155 to Kern relates to a ball check valve type of lubrication fitting having a unitary tubular housing formed of a resilient deformable material with a series of axially spaced outwardly extending concentric ribs circumferally formed on the exterior surface of the housing for engaging the interior wall surfaces of a complementary mounting opening and deforming in a manner to retain the fitting in the opening.

U.S. Pat. No. 3,620,228 to Schmid relates to a device for attaching in the pipes of irrigating systems for removing silt and draining water composed of a tee for inserting in pipeline, a long drop pipe accommodating a valve seat, interior longitudinal flanges above said seat, and a buoyant captive ball between; ball being forced to seat under water pressure and rising when pressure is relieved, permitting silt and water to pass into open end sump below.

U.S. Pat. No. 3,661,167 to Hussey teaches a diaphragm or piston type chemical feed pump having an influent valve and an effluent valve connected to the pumping chamber each having in some combination a single or multiple ball check valve system. The valves of the pump are doubled and reversible within separable casings having oppositely disposed ball recesses so that the same set of parts can be assembled into an inlet or outlet ball check valve. For precise sealing, each valve has a resilient, self cleaning ball valve seat.

U.S. Pat. No. 4,286,622 to Ninomiya et al. pertains to a check ball valve assembly including a main valve body member taking the form of a rigid combination of a hollow cylindrical body element and a pipe coupling member at one end of the body element. The main valve body contains therein a movable ball valve member. In this valve assembly a further or second pipe coupling member is detachably connected at the opposite end of the body element. A resilient or elastomeric, double-functioning sealing member is positioned between the body element and the second pipe coupling and is so shaped and arranged to execute at its inside a detachable sealing function with the ball valve member and at the same time to execute at its outside a sealing function between the main valve body and the detachable pipe coupling member. The valve assembly further includes a retainer ring positioned stationarily behind the sealing member when seen in the regular fluid passage direction of the valve assembly. The retainer has a central tapered, fluid passage allowing bore, for engagement with the valve ball member for preventing an excess pressure contact of the latter with the sealing member. In the valve assembly, there are no 0 rings fitted therein.

U.S. Pat. No. 4,287,912 to Hewett discloses a monoflow ball valve that is particularly suited using plastic materials that resist metal-corrosive acids, as in a spray system using hydrofluoric acid and the like. The valve has a valve body with a passage section smaller than the external diameter of the ball and the ball is forced into the generally cylindrical passage section to become a highly effective fluid-tight seal. A spacer at the inlet forms with the ball a second fluid-tight seal and is adjustably movable to dislodge the ball from the passage section if required.

U.S. Pat. No. 4,295,412 to Hachiro teaches a hose with a one-way valve used in a brake actuating system for automobiles. A one-way valve unit is housed in a flexible hose for connecting a booster shell of a servomotor with an intake manifold of the internal combustion engine so as to prevent leakage of vacuum. A valve housing receives therein a valve member and a valve spring thereby forming the one-way valve unit. The housing further has a valve seat, a cylindrical guide portion and an annular seal projection of diameter larger than the guide portion. A fastening band is provided on the outer periphery of the hose to prevent movement of the one-way valve and is marked with a mounting direction of the hose.

U.S. Pat. No. 4,611,374 to Schnelle et al. pertains to a check valve formed integrally with a tube without requiring any additional components. The ball or poppet of the check valve is maintained in position via a magnetic mandrel while the tube is crimped at both sides of the poppet. The tube is inwardly crimped to prevent the poppet from being displaced in either direction and simultaneously to allow flow to bypass the poppet in the desired flow direction. Thereafter the poppet is physically displaced against one of the crimped indentations to coin a seat such that the poppet and the seat coact to prevent flow of fluid in the undesired direction.

U.S. Pat. No. 4,667,696 to van Rensburg relates to an adjustable nonreturn ball valve for connection in a pipeline. The valve includes an elongate unobstructed main housing arranged to be connected at each end to flow pipes. There is an auxiliary housing located intermediate the ends of the main housing which has a longitudinal axis obtuse to the longitudinal axis of the main housing. There is a removable circular valve seat extending across the main housing at an obtuse angle relative thereto. The main housing is formed in two sections which are joined together at the plane of the valve seat. A ball is positioned to close upon the valve seat and is loosely entrapped in the auxiliary housing to allow flow in only one direction through the main housing, in which event and in use the ball automatically rides up in the auxiliary housing and away from the valve seat. The ball and the auxiliary housing have diameters greater than the diameter of the main housing, thereby preventing the ball from moving through the main housing. The junction of the auxiliary housing and the main housing form a ramp to assist in moving the ball into the auxiliary housing in response to flow through the main housing. There is an adjustable, mechanically operable closure device for the valve which fits at an upper end of the auxiliary housing and is arranged to urge and hold the ball downwards toward the valve seat to throttle or close off the valve according to the setting of the closure device.

U.S. Pat. No. 4,955,407 to Inoue discloses the valve body construction of a check valve which is insertable into the interior of a flexible hose, which valve body comprises a valve body portion having one of an inlet port and an outlet port, and a valve end piece having the other of the inlet and outlet ports, wherein the valve end piece is formed with annular grooves extending in the circumferential direction thereof along the opposite sides across a joint surface between the valve body portion and the valve end piece. The outer diameter of the valve body portion is made slightly greater than the inner diameter of the hose, the valve end piece being provided with a gradually enlarged diametered portion having a largest outer diameter equal to or slightly greater than the outer diameter of the valve body portion, and also with a shouldered portion behind the largest outer diametered portion U.S. Pat. No. 5,139,047 to Reinicke relates to a miniaturized check-valve having a length of straight cylindrical tubing for its body, wherein the open ends of the tube are the inlet (or upstream) and outlet (or downstream) ports of the valve. The tubular body is locally deformed to fixedly retain an inserted annular valve-seat member at a first axial location of downstream offset from the inlet end of the pipe. The tubular body is also locally deformed, at a second axial location of upstream offset from the outlet end of the pipe, to fixedly retain another annular member which serves to establish a fixed reference for the downstream end of a compression spring which continuously urges a valve member into its valve-closing relation with the valve-seat member.

U.S. Pat. Nos. 5,649,360 and 5,653,258 to Schwarz teach a vent valve for a thermostatic valve of a coolant circuit of an internal combustion engine having a ball with a radius and a diameter and serving as a sealing element, and a one-piece metal cage for the ball. The cage has a pot-shaped part with an inside diameter larger than the diameter of the ball, and a bottom having a valve opening surrounded by an outwardly projecting neck. The cage is shaped in one piece from an originally flat metal sheet by stamping, deep-drawing, and pressing, and the pot-shaped part has a height approximately the radius of the ball, and an edge abutted by a plurality of uniformly distributed tabs located on an axial extension of the pot-shaped part, the tabs having inwardly bent ends to retain the ball in the cage with play, the length of the tabs being greater than or equal to the height of the pot-shaped part.

U.S. Pat. No. 5,785,083 to Tang pertains to a check valve connectable in a refrigerant line and fabricated from only four parts—(1) a copper tubing body connectable in the refrigerant line, (2) a nonmetallic shutoff ball, (3) an annular valve seat member having a diametrically opposite pair of leg portions axially projecting from one end thereof, and (4) an annular stop member also having a diametrically opposite pair of leg portions axially projecting from one end thereof, and further having a diametrically opposite pair of axially extending outer side surface grooves formed therein. The seat and stop members are locked together to form a cage structure by axially press-fitting the valve seat member outer leg ends into the stop member grooves in a manner such that the stop member legs underlie and support the seat member legs, with outer ends of the stop member legs facing a conical seating surface of the seat member in an axially spaced relationship therewith. The shutoff ball is captively retained laterally between the seat member legs for axial movement within the cage structure between an open position in which the ball seals against the seating surface, and an open position in which the ball is axially moved away from the seating surface and is stopped by the outer ends of the stop member legs. The cage is coaxially and captively retained in a longitudinally central portion of the copper tubing body between two elongated, spun-down, reduced diameter end portions thereof that may be soldered into a refrigerant line.

U.S. Pat. No. 6,267,137 B1 to Watanabe et al. teaches a ball check valve having a body having a flow path and a turnout path formed therein and provided on a primary side thereof with an inlet and on a secondary side thereof with an outlet. A ball in the body a seating part for the ball, disposed in the inlet of the body and inclined toward the primary side in a state having the flow path laid horizontally, and a guide part provided with a part for causing the ball seated at the seating part to be retracted into the turnout path and guiding the retracted ball to the seating part, are provided. A pumping apparatus for discharging a fluid from a storage tank includes a pump alternating motions of pumping and stopping for controlling the fluid in the storage tank to a predetermined amount, a piping for discharging to the exterior the fluid of the storage tank being forwarded by the pump, and a ball check valve disposed on the piping and adapted to prevent the discharged fluid from flowing backward during stoppage of the pump.

U.S. Pat. No. 8,146,618 B2 to Szuster pertains to a valve wherein a supporting blind of a deflected channel is terminated at its free ends with oblique surfaces, and a guiding rail of the ball is terminated with the supporting directional arrangement directing the ball toward the supporting blind of the deflected channel, and the top, which is positioned closer to the valve outlet than to the inlet, and together with the oblique surfaces of the supporting blind of the deflected channel produce a slot widening itself to the direction of deflected channel interior.

U.S. Patent Application Publication No. 2005/0121084 A1 to Andersson discloses a ball check valve comprising a housing having walls defining a fluid inlet, a fluid outlet, and a chamber communicating with the inlet and with the outlet. The ball check valve includes a spherical hollow ball housing a plurality of spherical shock absorbing members that stabilize the spherical hollow ball during operation of the valve. The spherical hollow ball moves between a first, flow impeding position adjacent the inlet and a second position spaced from the inlet laterally of a fluid passageway in the chamber.

U.S. Patent Application Publication No. 2010/0206404 A1 to Morrison et al. relates to a ball check valve configured for use as a pressure vessel. In one embodiment of the invention, the ball check valve comprises a housing defining one or more inlet, an outlet and a passageway therebetween. A ball support system is mounted within the housing, wherein one or more balls are supported by the ball support system. The ball support system is configured to allow a ball to close off and open a respective inlet. The housing generally comprises an inlet section which can have one or more inlets, wherein each inlet defines a ball seat sealingly engageable with a ball for sealing the inlet. The housing further comprises a center section providing adequate space to allow movement of the ball and an outlet section comprising an outlet for transferring the fluid to a subsequent portion of a piping network. The ball support system is configured to guide the movement of each of the one or more balls, wherein the movement of each ball is guided from a first position wherein the ball is proximate to a ball seat located at an inlet and thereby sealing that inlet, to a second position wherein fluid flow through an inlet into the valve is enabled.

U.S. Patent Application Publication No. 2014/0026987 A1 to Ayers et al. teaches a relief valve for extracting sub-surface gas from beneath a geomembrane includes a valve body for permitting gas to flow therethrough and includes an inlet, an outlet, a vertical run communicating with the inlet, and a lateral run communicating with the vertical run and the outlet. A ball valve comprising a ball seat is positioned within the vertical run. A lightweight valve ball is positioned within the vertical run. The valve ball is movable therewithin between a lowered position against a ball seat and an elevated position distal therefrom. The valve ball is lightweight enough that minimal upward gas flows within the vertical run cause the valve ball to rise and become unseated from the ball seat such that stoppage of such vertical flows or reverse flows cause the valve ball to drop back to its ball seat and seal against reverse flows through the ball valve.

Accordingly, there exists a need for two ball piston pumps for pumping heavy fillers or aggregates or cementitious material and the like that are specifically designed to reduce the likelihood of creating compressed or hardened and packed out material. Additionally, in such piston pumps there exists a need for valves that seal adequately to prevent water or fluid within the material from separating out when pumping heavily filled material.

SUMMARY

A non-limiting exemplary embodiment of a pump includes an inlet port, an inlet section in fluid communication with the inlet port, an outlet port, an outlet section in fluid communication with the outlet port, a substantially hollow middle section extending between and in fluid communication with the inlet and outlet sections, a piston configured for rectilinear displacement, a substantially hollow ball guide configured for rectilinear displacement within the pump, and a seat. The piston includes spaced-apart opposing first and second ends, wherein the first end of the piston is operatively coupled with a prime mover. The ball guide includes a ball disposed therewithin and spaced-apart opposing first and second ends. The first end of the ball guide is operatively coupled to the second end of the piston. The second end of the ball guide includes an opening having one or more seals along an outer perimeter thereof, and a plurality of spaced-apart posts extending between the first and second ends of the ball guide. The one or more seals are configured for providing a sliding-sealing interface along the outer perimeter of the second end of the ball guide. The seat is disposed at the second end of the ball guide. A pressure applied on the ball in a first direction sealingly seats the ball on the seat, thereby inhibiting flow of material across the opening at the second end of the ball guide. A pressure applied on the ball in a second direction unseats the ball from the seat and displaces the ball away from the opening at the second end of the ball guide.

A non-limiting exemplary embodiment of a pump includes an outlet port, an outlet section in fluid communications with the outlet port, an inlet port, an inlet section in fluid communications with the inlet port, a substantially hollow middle section extending between and in fluid communication the inlet and outlet sections, a ball cage comprising a ball disposed therewithin, a ball guide comprising a ball disposed therewithin, and a piston configured for displacing the ball guide towards and away from the ball cage.

BRIEF DESCRIPTION OF THE DRAWINGS

FIG. 4 is a cross-sectional side view of a non-limiting exemplary embodiment of a ball cage;

DETAILED DESCRIPTION

One or more non-limiting embodiments are described herein with reference to the accompanying drawings, wherein like elements are designated by like numerals. It should be clearly understood that there is no intent, implied or otherwise, to limit the disclosure in any way, shape or form to the illustrated and described embodiments. While multiple exemplary embodiments are described, variations thereof will become apparent or obvious. Accordingly, any and all variants for providing functionalities similar to those of the described embodiments are considered as being within the metes and bounds of the instant disclosure.

Figure 1A:
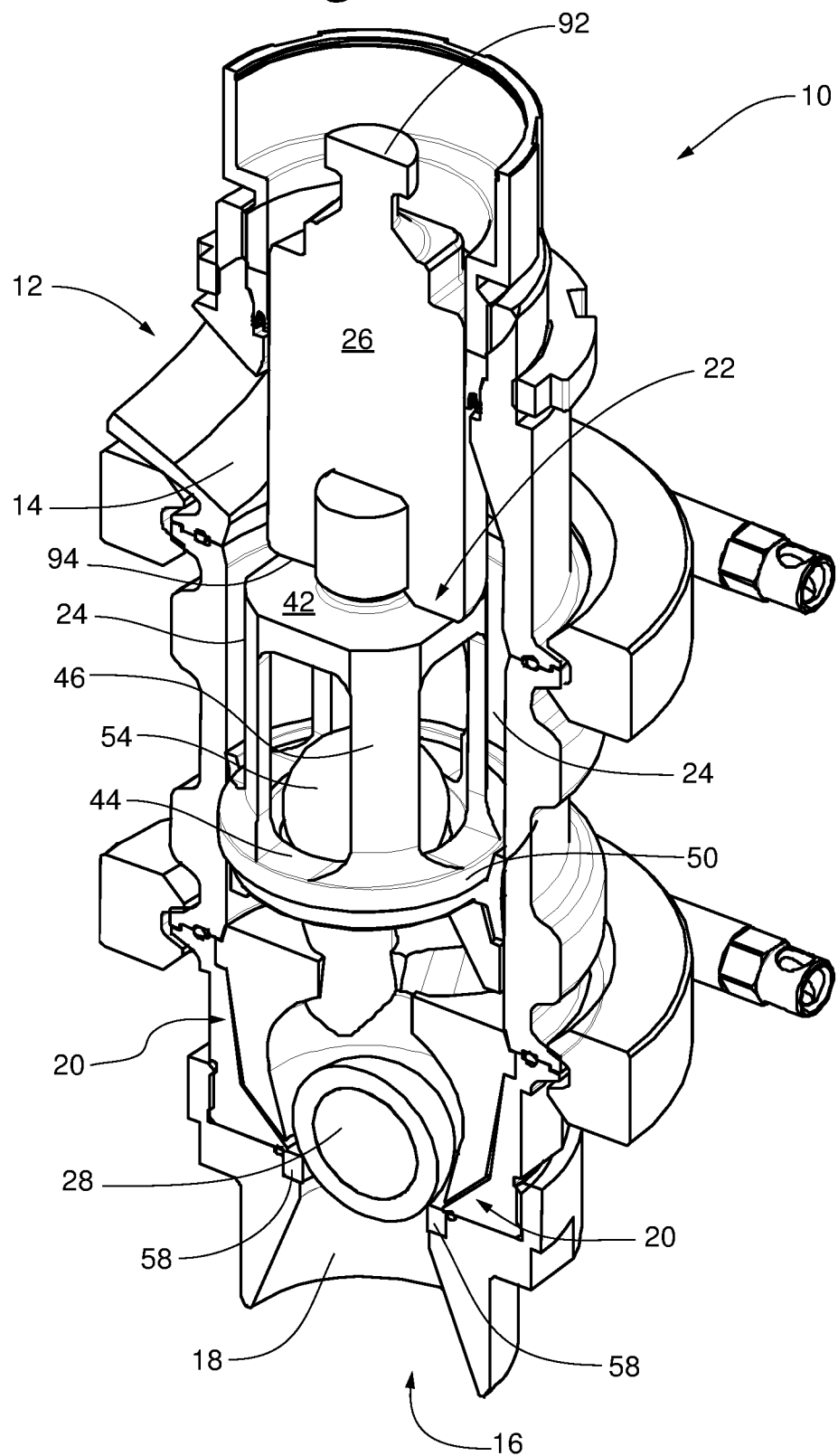
FIG. 1A is a cross-sectional perspective view of a non-limiting exemplary embodiment of a pump.
Figure 1B:
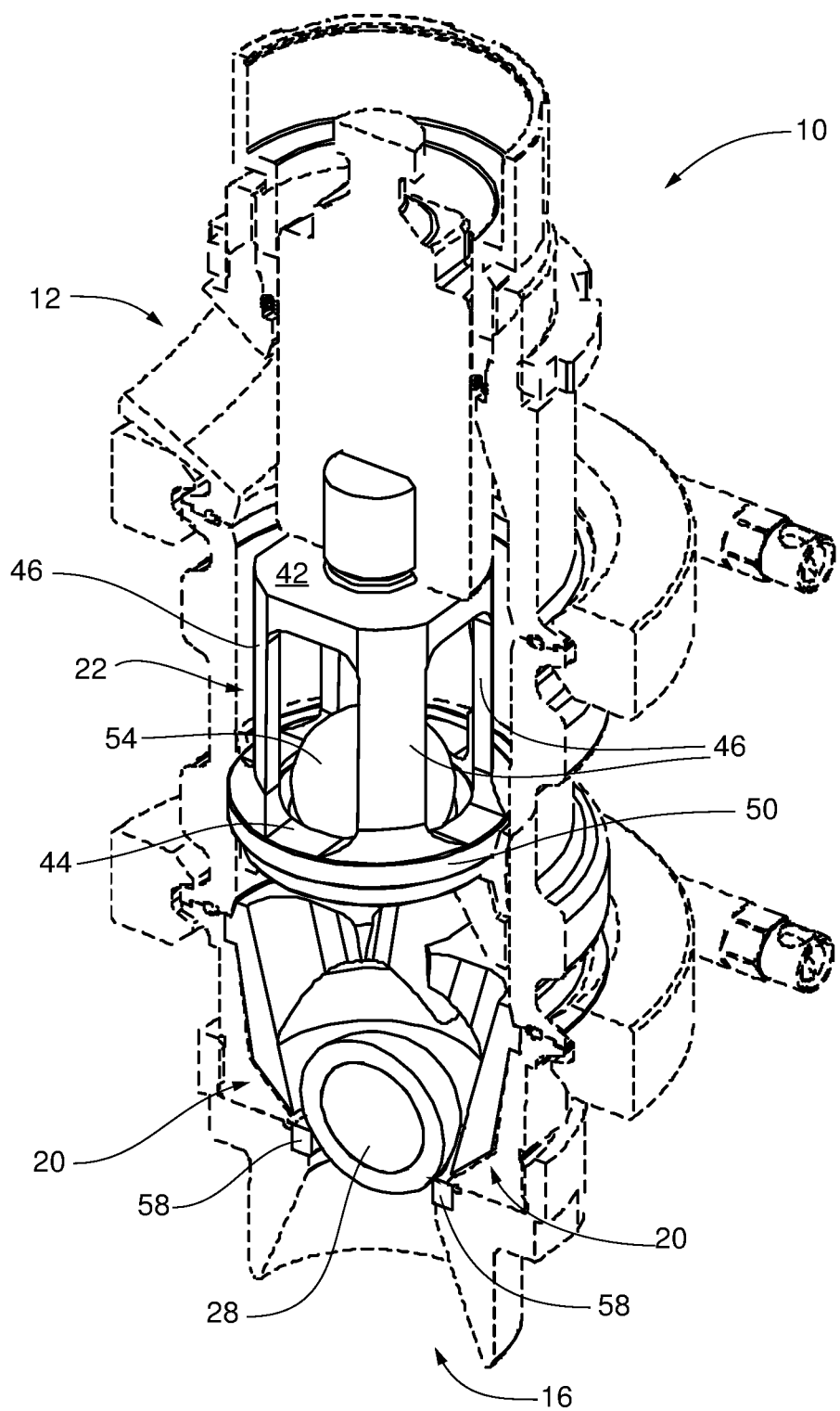
FIG. 1B is a cross-sectional perspective view illustrating non-limiting exemplary embodiments of a ball cage and a ball guide of the pump illustrated in FIG. 1A.
Figure 2A:
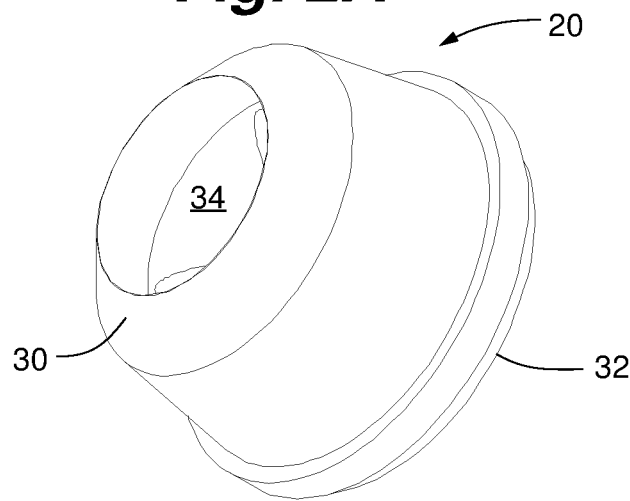
FIG. 2A is a perspective view of the ball cage illustrated in FIGS. 1A and 1B as viewed from a first end thereof.
Figure 2B:
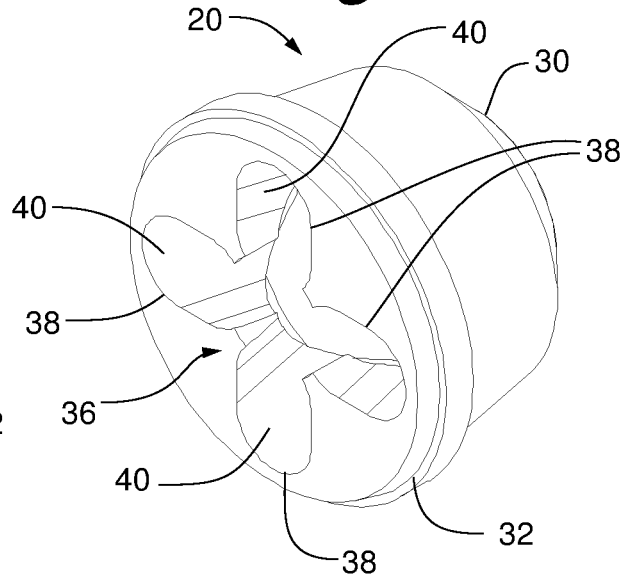
FIG. 2B is a perspective view of the ball cage illustrated in FIGS. 1A and 1B as viewed from a second end thereof.
Figure 2C:
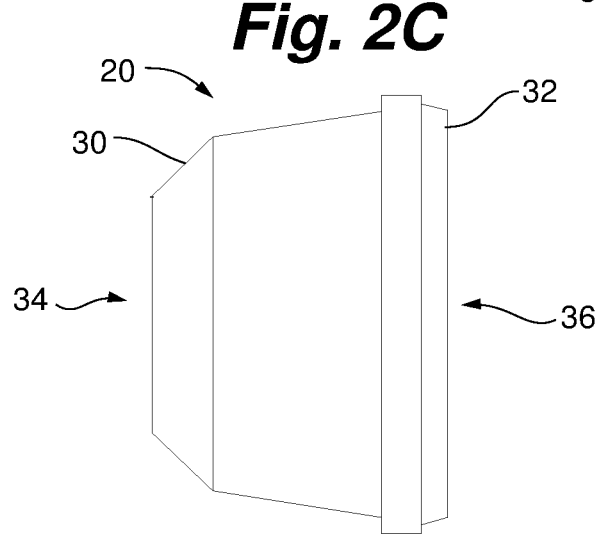
FIG. 2C is a side view of the ball cage illustrated in FIGS. 2A and 2B.
Figure 2D:
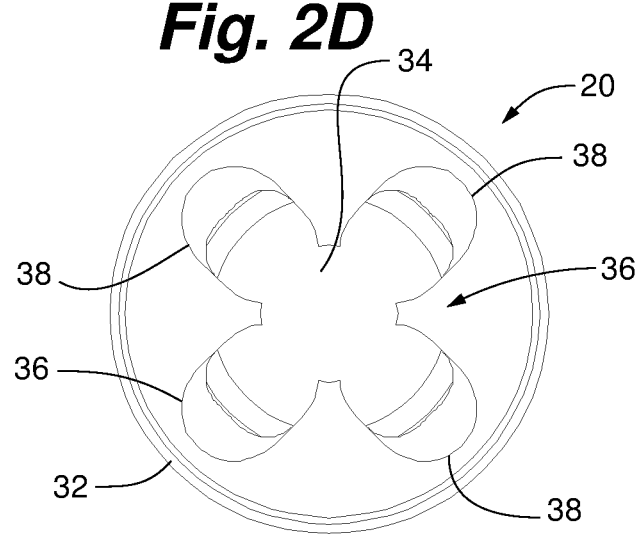
FIG. 2D is an end view of the ball cage illustrated in FIGS. 2A and 2B as viewed from the second end thereof.

FIGS. 1A and 1B illustrate a cross-sectional perspective view of a non-limiting exemplary embodiment of a pump 10. The pump 10 includes an outlet port 12, an outlet section 14 in fluid communications with the outlet port 12, an inlet port 16, an inlet section 18 in fluid communication with the inlet port 16, a ball cage 20 having at least a portion thereof disposed within at least a portion of the inlet section 18, a substantially hollow ball guide 22 configured for rectilinear displacement, a substantially hollow middle section 24, and a piston 26.

FIGS. 2A-2D illustrate various views of a non-limiting exemplary embodiment of a ball cage 20. As illustrated in FIGS. 1A and 1B, ball cage 20 includes a ball 28 disposed therewithin, spaced apart opposing first and second ends 30 and 32, respectively, a first opening 34 at the first end 30, and a second opening 36 at the second end 32. The first opening 34 is in fluid communication with the inlet port 16. In some embodiments, the ball cage 20 is configured for uninhibited movement of the ball 28 disposed therewithin.

Figure 5:
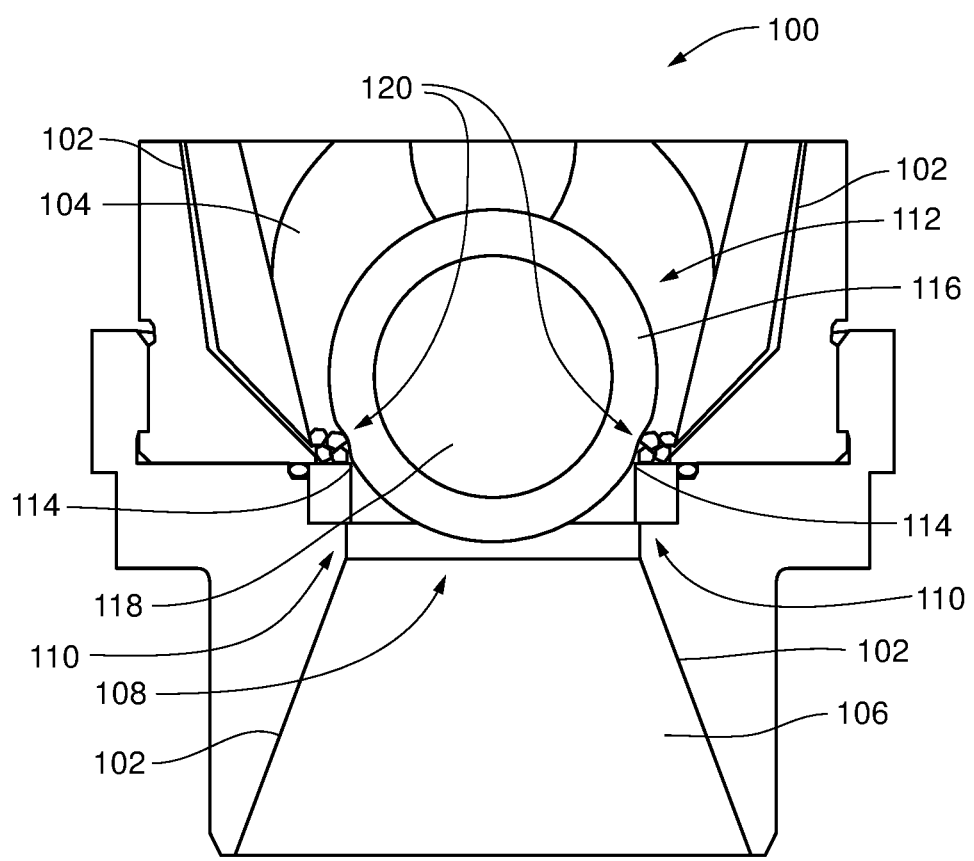
FIG. 5 is a cross-sectional side view of a non-limiting exemplary embodiment of a check valve.

In a non-limiting exemplary embodiment, the ball cage 20 is at least partially configured to operate or function as a check valve as described herein with reference to FIGS. 4 and 5. In some embodiments, a pressure applied on the ball 28 in a first direction, for example generally away from the second opening 36, displaces the ball 28 away from the second opening 36 and towards the first opening 34. And, a pressure applied on the ball 28 in a second direction, for example generally away from the first opening 34, displaces the ball 28 away from the first opening 34 and towards the second opening 36. As such, the first and second ends 30 and 32 operate as ball stops for the ball 28 disposed within the ball cage 20.

When the ball 28 is positioned over at least a portion of the second opening 36, the ball 28, at least partially, blocks the flow of material through at least that portion of the second opening 36 over which the ball 28 is positioned. Consequently, one or more smaller openings 38, defined at least in part by the unblocked portions of the second opening 36, are formed at the second end 32 of the ball cage 20. As such, at least one or more passages 40, defined at least in part by the ball 28 and a wall of the ball cage 20, extend between the first opening 34 at the first end 30 of the ball cage 20 and at least one of the one or more smaller openings 38 formed at the second end 32 of the ball cage 20. Consequently, material entering the pump 10 through the inlet port 16 flows into the ball cage 20 through the first opening 34 and along the at least one or more passages 40 to exit the ball cage 20 through the one or more smaller openings 38 at the second end 32.

In a non-limiting exemplary embodiment, a cross-sectional area of each of the one or more passages 40 decreases between the first opening 34 and the corresponding smaller opening 38 at the second end 32 of the ball cage 20. As will be apparent to one having ordinary skill in the art, such a change in the geometry of a passage will subject the material flowing therein to the venturi effect. As such, the operation and functionality of each of such one or more passages 40 is substantially similar to that of a nozzle or an orifice wherein the flow velocity of the material exiting the passage 40 through each of the smaller openings 38 in the second end 32 will be greater than the flow velocity of the material entering that passage 40, for instance at or proximate the first opening 34 of the ball cage 20. In some applications, such as in pumping fillers or aggregates or cementitious material and the like, such increases in the flow velocity may be advantageously used or applied to prevent the pump 10 from "packing out" and to "flush" or "carry along" compressed or hardened material and aggregate out of the ball cage 20.

Figure 3A:
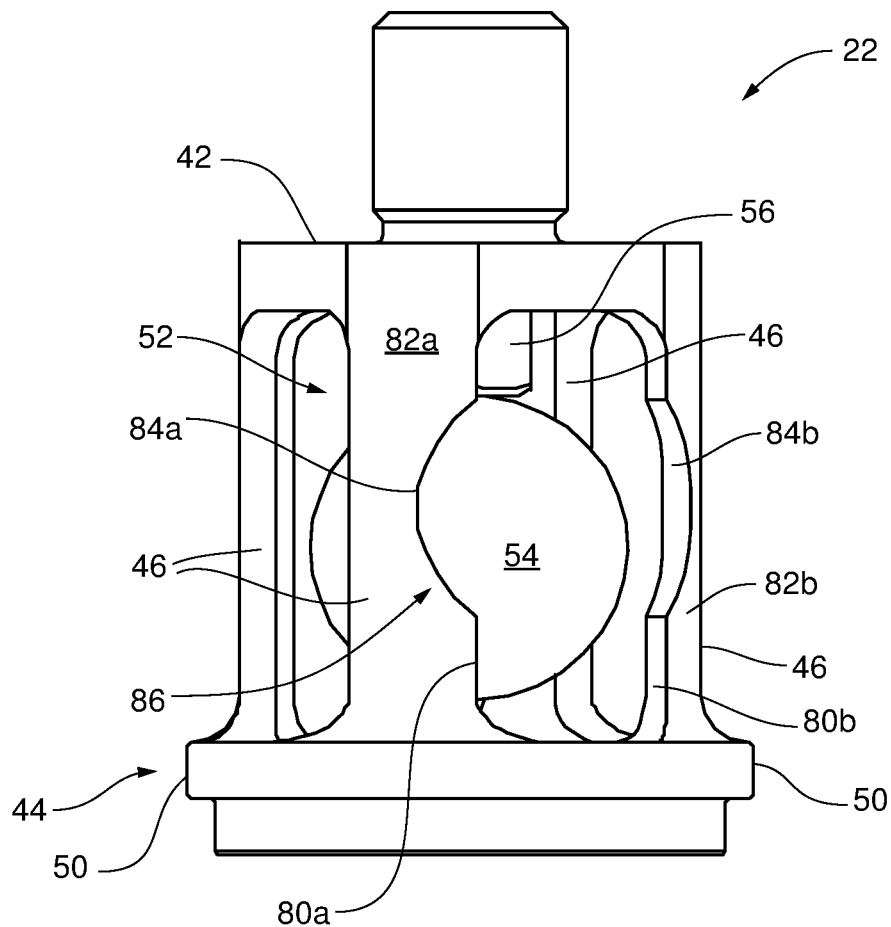
FIG. 3A is a side view of the ball guide illustrated in FIGS. 1A and 1B.
Figure 3B:
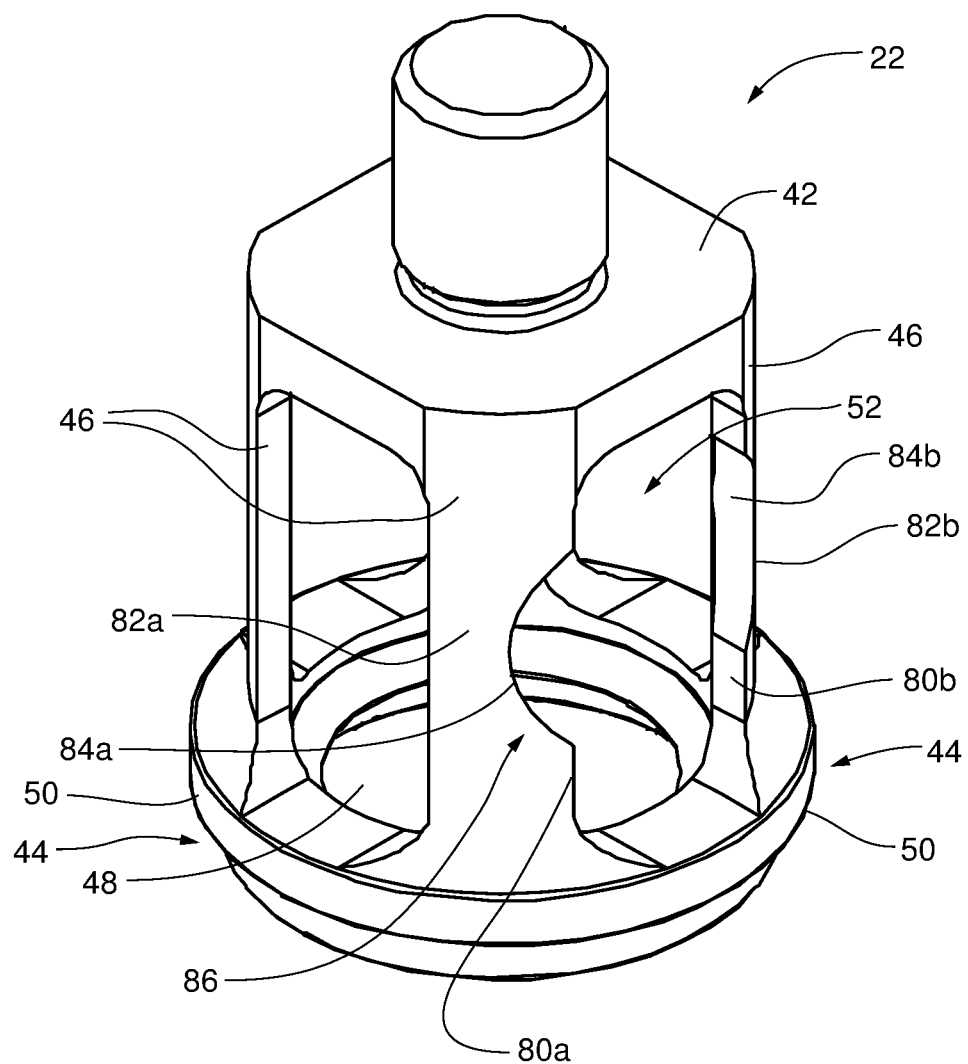
FIG. 3B is a perspective view of the ball guide illustrated in FIG. 3A without a ball disposed therewithin.

FIGS. 3A and 3B illustrate a non-limiting exemplary embodiment of the ball guide 22 defined at least in part by, spaced-apart opposing first and second ends 42 and 44, respectively, and a plurality of spaced-apart posts 46 extending between, and connecting, the first and second ends 42 and 44. The second end 44 of the ball guide 22 includes an opening 48, and at least one or more seals (not shown) along the entire outer perimeter 50 of the ball guide 22. The at least one or more seals are configured for providing a sliding-sealing interface along the entire outer perimeter 50 of the second end 44. In certain embodiments, the interior 52 of the ball guide 22 is configured for uninhibited displacement of a ball 54 disposed therewithin.

In a non-limiting exemplary embodiment, the ball guide 22 is at least partially configured to operate or function as a check valve as described herein with reference to FIGS. 4 and 5. In one such embodiment, a pressure applied on the ball 54 in a first direction, for example generally towards the opening 48, displaces the ball 54 towards the opening 48 and positions the ball 54 over the opening 48, thereby at least partially inhibiting flow of material across the opening 48. And, a pressure applied on the ball 54 in a second direction, for example generally away the opening 48, displaces the ball 54 away from the opening 48. In some embodiments, a ball stop 56 extending into the ball guide 22 from the first end 42 limits the distance that the ball 54 travels when displaced away from the opening 48 in the second end 44 of the ball guide 22. In certain embodiments, the extent to which the ball stop 56 extends into the ball guide 22 is adjustable. Such adjustability of the ball stop 56 may be used advantageously to "meter" the flow or control the amount of material flowing across the opening 48. In some embodiments, the ball stop 56 is removable. The sliding-sealing interface along the outer perimeter 50 of the second end 44 inhibits the flow of material, i.e., inhibits leakage, across the outer perimeter 50 of the second end 44 of the ball guide 22.

In some embodiments, either one or both the ball cage 20 and the ball guide 22 include a seat against which their respective balls 28 and 54 can be sealingly seated. As such, the combination of the ball cage 20, its seat, and ball 28 is configured to operate like a check valve. Likewise, the combination of the ball guide 22, its seat, and ball 54 is configured to operate like a check valve.

FIG. 4 illustrates at least a portion of the ball cage 20 proximate the first end 30 having a seat 58 disposed at the first opening 34. In a non-limiting exemplary embodiment, the seat 58 is defined at least in part by a relatively sharp-edged hard perimeter 88 against which the ball 28 is seated. In some embodiments, the perimeter 88 of the seat 58 is defined at least in part by a radiused or chamfered edge (not shown) along at least a portion thereof against which the ball 28 gets seated.

In a non-limiting exemplary embodiment, the ball 28 is a compliant ball defined at least in part by a compliant coating 72 encasing a substantially rigid core 74. In certain embodiments, the compliant coating 72 is an elastomeric material. In some embodiments, when the compliant ball 28 is seated on the perimeter 88, at least a portion 76 of the compliant coating 72 seated along or in contact with the perimeter 88 deforms at least partially around the aggregate or filler present in the flow. Consequently, at least a portion of the compliant ball 28 is displaced across the perimeter 88 to form a seal therearound to inhibit the flow of material across the first opening 34. In some embodiments, the deformation of the compliant coating 72 and displacement across the perimeter 88 enhances the integrity of the seal. In certain non-limiting exemplary embodiments, a thickness of the compliant coating 72 relative to a size of the substantially rigid core 74 is optimized for one or more of weight, sealing effectiveness, and life of the compliant coating 72.

As will be apparent to one having ordinary skill in the art, the combination of the ball cage 20 and the seat 58, such as the embodiment illustrated in FIG. 4, is configured to operate or function as a check valve. For instance, when the compliant ball 28 is displaced away from the first opening 34 and towards the second opening 36, the compliant ball 28 is un-seated from the seat 58 and material will flow across the first opening 34. Conversely, material will be inhibited from flowing across the first opening 34 when the compliant ball 28 is displaced away from the second opening 36 and towards the first opening 34 and sealingly seated on the seat 58 at the first opening 34.

In a non-limiting exemplary embodiment, the ball guide 22 is also configured as a check valve having a seat 60 disposed at the opening 48 at the second end 44 of the ball guide 22. In some embodiments, the seat 60 is structurally, operationally, and functionally substantially similar to the seat 58. As such, the seat 60 is also defined at least in part by a relatively sharp-edged hard perimeter, substantially similar to perimeter 88, against which the ball 54 is sealingly seated. In some embodiments, the perimeter of the seat 60 is defined at least in part by a radiused or chamfered edge along at least a portion thereof against which the ball 54 gets sealingly seated.

In a non-limiting exemplary embodiment, the ball 54 disposed within the ball guide 22 is a compliant ball substantially similar to the compliant ball 28. As such, the compliant ball 54 is also defined at least in part by a compliant coating substantially similar to compliant coating 72 encasing a substantially rigid core such as rigid core 74. Accordingly, when the compliant ball 54 is displaced towards the opening 48 at the second end 44 of the ball guide 22 and sealingly seated on the seat 60, the flow of material across the opening 48 is inhibited. Conversely, material will flow across the opening 48 at the second end 44 of the ball guide 22 when the compliant ball 54 is displaced away from the opening 48 and unseated from the seat 60.

FIG. 5 illustrates a non-limiting exemplary embodiment of a generic check valve 100 of the instant disclosure. The check valve 100 is defined at least in part by a substantially hollow valve body 102 having a first and a second section 104 and 106, respectively, and an aperture 108 through which the first and second sections 104 and 106 are in fluid communication with each other. The check valve 100 also includes a seat 110 at the aperture 108, and a plug 112 disposed, for example, in the first section 104. In some embodiments, the seat 110 and the plug 112 are configured for sealingly seating the plug 112 along a perimeter 114 of the seat 110 at the aperture 108 for inhibiting flow of material thereacross. Accordingly, the aperture 108 and the plug 112 are dimensioned or configured for inhibiting the displacement of the plug 112 across the aperture 108, i.e., the plug 112 cannot dislocate from the first section 104 into the second section 106. The first section 104 is configured for uninhibited displacement of the plug 112 disposed therewithin. Thus, as will be apparent to one having ordinary skill in the art, the check valve 100 is configured to operate or function in a manner whereby when the plug 112 is unseated from the seat 110 and displaced away from the aperture 108, material may flow across the aperture 108 between the first and second sections 104 and 106. Accordingly, when the pressure in the second section 106 is relatively higher than the pressure in the first section 104, the plug 112 will un-seat from the seat 110, and will be displaced away from the aperture 108. Consequently, material will flow across the aperture 108 from the second section 106 to the first section 104. Conversely, the flow of material across the aperture 108 between the first and second sections 104 and 106 is inhibited when the plug 112 is sealingly seated on the seat 110. Accordingly, when the pressure in the first section 104 is relatively higher than the pressure in the second section 106, a pressure acting on the plug 112 will displace the plug 112 towards the aperture 108 to seat on the seat 110 and close the aperture 108. Consequently, material will be inhibited from flowing across the aperture 108 from the first section 104 to the second section 106.

In a non-limiting exemplary embodiment, the plug 112 is a compliant ball defined at least in part by a substantially compliant coating 116 encasing a substantially rigid core 118. In certain embodiments, the compliant coating 116 is an elastomeric material. In some embodiments, when the compliant ball, i.e., the plug 112 is seated on the seat 110, at least a portion 120 of the compliant coating 116 seated along or in contact with the perimeter 114 of the seat 110 deforms at least partially to form a seal therearound to inhibit the flow of material across the aperture 108. In some embodiments, the deformation of the compliant coating 116 enhances the integrity of the seal at the aperture 108, i.e., the seal between the seat 110 and the plug, or the compliant ball, 112. In certain non-limiting exemplary embodiments, a thickness of the compliant coating 116 relative to a size of the substantially rigid core 118 is optimized for one or more of weight, sealing effectiveness, and life of the compliant coating 116.

In a non-limiting exemplary embodiment, either one or both balls 28 and 54 are structurally configured and are operationally and functionally substantially similar to the plug 112. In other words, as described with reference to FIG. 4, either one or both balls 28 and 54 are defined at least in part by a compliant coating 72 encasing a substantially rigid core 74. Accordingly, the compliant ball 28, as with plug 112 for example, will sealingly close the first end 30 of the ball cage 20 when seated on the seat 58 at the first end 30. Likewise, the compliant ball 54, as with the plug 112 for example, will sealingly close the second end 44 of the ball guide 22 when seated on the seat 60 at the second end 44.

In a non-limiting exemplary embodiment, the seat 110 of the check valve 100 is defined at least in part by a relatively hard sharp-edge along at least a portion of its perimeter 114 against which the plug, i.e., the compliant ball, 112 is seated. Accordingly, in certain embodiments, the seats 58 and 60 at the first opening 34 and the opening 48 are defined at least in part by a relatively hard sharp-edge along at least a portion of their respective perimeters against which the corresponding compliant ball 28 and 54 is seated. In a non-limiting exemplary embodiment, the seat 110 of the check valve 100 is defined at least in part by a radiused or chamfered edge (not shown) along at least a portion of its perimeter 114 against which the plug, i.e., the compliant ball, 112 is seated. Accordingly, in some embodiments, one or more of the seats 58 and 60 at the first opening 34 and the opening 48 are defined at least in part by a radiused or chamfered edge along at least a portion of their respective perimeters against which the corresponding compliant ball 28 and 54 is seated.

Referring to FIG. 3A, in some embodiments, the plurality of posts 46 of the ball guide 22 are spaced apart from each other such that the compliant ball 54 cannot move unassisted into or out of the interior 52 of the ball guide 22. In certain embodiments, the compliant coating, such as compliant coating 72, of the compliant ball 54 deforms sufficiently when an operator pushes the compliant ball 54 into and out of the interior 52. In certain embodiments, each of the plurality of posts 46 are substantially rigid. In some embodiments at least one of the plurality of posts 46 is sufficiently flexible or compliant such that the compliant ball 54 can be pushed past the at least one flexible post. In certain embodiments, opposing side 80a and 80b of at least two adjacent posts 82a and 82b include opposing contoured sections 84a and 84b. As such, a contoured opening 86, defined at least in part by the opposing contoured sections 84a and 84b, is provided through which the compliant ball 54 can be removed from the interior 52, in some embodiments after the ball stop 56 is removed from the ball guide 22 ball 54 is allowed to travel through the contoured opening 86. In some embodiments, only one of the plurality of posts 46 is contoured.

Referring to FIG. 1A, the pump 10, in a non-limiting exemplary embodiment, includes a substantially hollow middle section 24 extending between the outlet section 14 and the ball cage 20. The middle section 24 is in fluid communications with the outlet section 14 and with the second opening 36 in the second end 32 of the ball cage 20. In certain embodiments, where the pump 10 does not include the ball cage 20, the substantially hollow middle section 24 extends between, and is in fluid communication with, the outlet and inlet sections 14 and 18, respectively.

In a non-limiting exemplary embodiment, the pump 10 includes a piston 26 configured for rectilinear displacement.

The piston 26, in some embodiments, includes spaced-apart opposing first and second ends, 92 and 94, respectively. The first end 92 is operatively coupled with a prime mover (not shown) configured for displacing or operating the piston 26. The second end 94 of the piston 26 and the first end 42 of the ball guide 22 are operatively coupled such that a rectilinear displacement of the piston 26 imparts a rectilinear displacement of the ball guide 22.

Figure 6A:
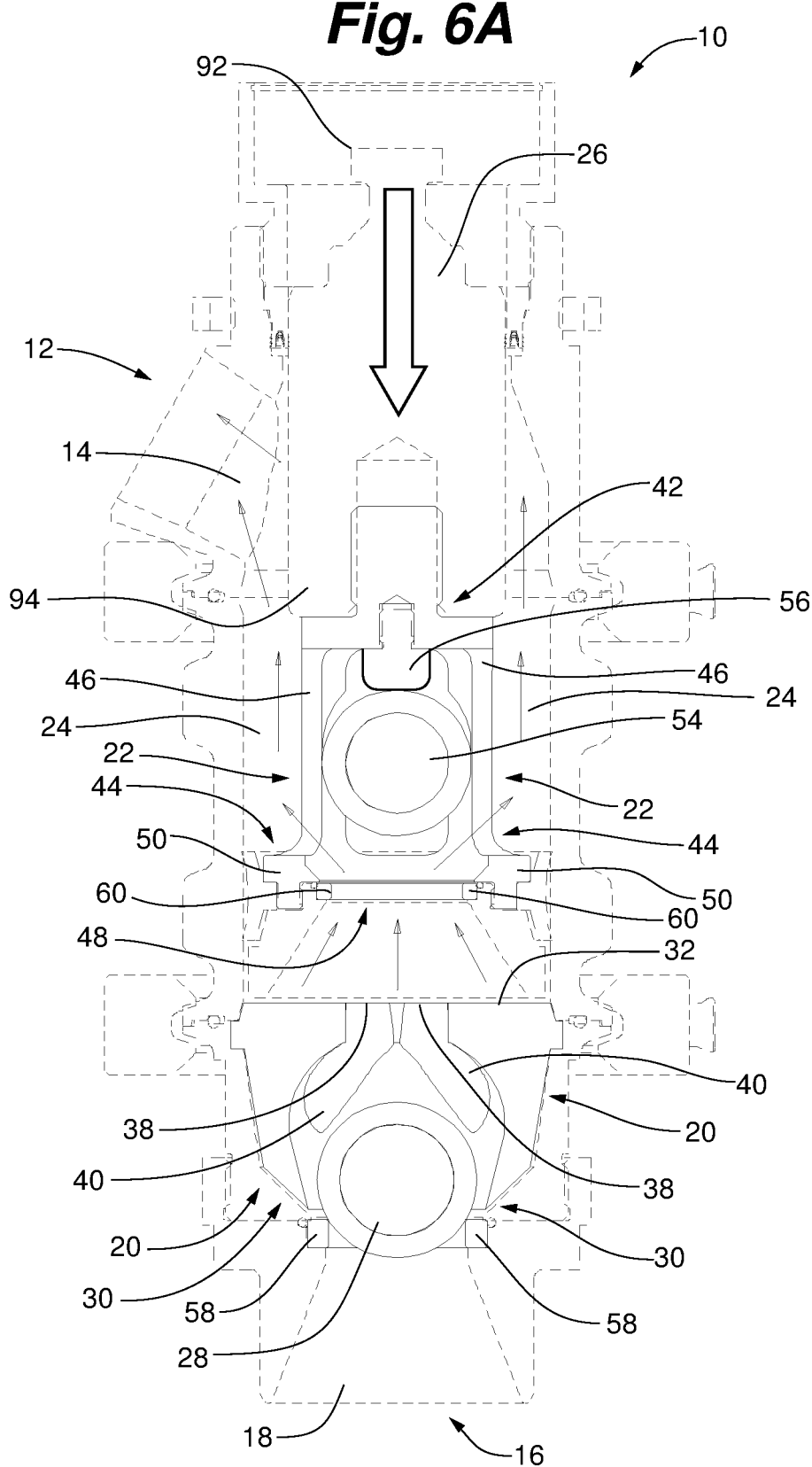
FIG. 6A is a side cross-sectional view of the pump illustrated in FIGS. 1A and 1B during movement of the ball guide towards the ball cage.

In accordance with a non-limiting exemplary embodiment, the pump 10 may be used for pumping fillers or aggregates or cementitious material and the like. FIG. 6A illustrates an exemplary operation of the pump 10 during a displacement of the ball guide 22 towards the ball cage 20, for example due to a displacement of the piston 26. Accordingly, the material between the ball cage 20 and the second end 44 of the ball guide 22, i.e., the material in the middle section 24, will get compressed. Consequently, a pressure applied on the ball 28 in the first direction displaces the ball 28 in the first direction towards the first opening 34 and sealingly seats the ball 28 on the perimeter 88 of the seat 58 to inhibit flow of material into the pump 10 from the inlet port 16. Concurrently, a pressure applied on the ball 54 displaces the ball 54 away from the opening 48 at the second end 44 of the ball guide 22. The compressed material flows through the opening 48 at the second end 44 of the ball guide 22, through the openings between the plurality of posts 46 of the ball guide 22, into the outlet section 14. The at least one or more seals (not shown) along the entire outer perimeter 50 of the second end 44 of the ball guide 22 inhibit flow of material across the outer perimeter 50. At least a portion of the material in the outlet section 14 may flow out of the pump 10 through the outlet port 12.

Figure 6B:
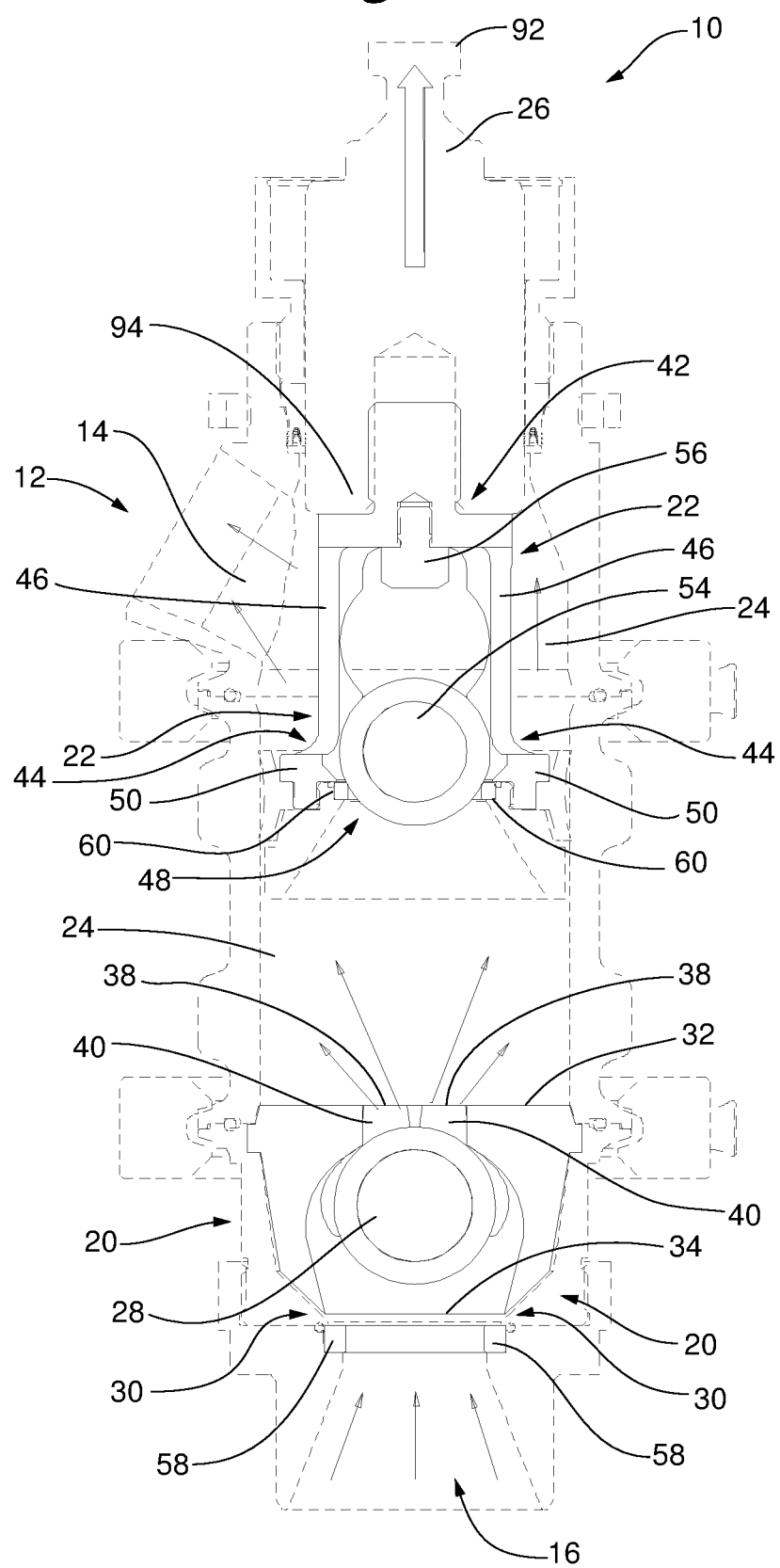
FIG. 6B is a side cross-sectional view of the pump illustrated in FIGS. 1A and 1B during movement of the ball guide away from the ball cage.

In the reverse cycle, such as that illustrated in FIG. 6B, the piston 26 displaces the ball guide 22 towards the outlet section 14, whereby at least a partial vacuum is created between the second end 32 of the ball cage 20 (or the inlet section 18) and the second end 44 of the ball guide 22, i.e., within the middle section 24. The at least one or more seals (not shown) along the entire outer perimeter 50 of the second end 44 of the ball guide 22 inhibits leakage thereacross, thus aiding in creating the at least partial vacuum. The ball 28 is displaced towards, and positioned over, the second opening 36 at the second end 32 of the ball cage 20, and the ball 54 is displaced towards, and sealingly seated on, the perimeter of the seat 60 at the opening 48 at the second end 44 of the ball guide 22. In addition to the at least partial pressure acting on the ball 28, the material flowing into the pump 10 through the inlet port 16 also acts on the ball 28 to displace the ball 28 towards the second opening 36 at the second end 32 of the ball cage 20. In addition thereto, material in the section between the second end 44 of the ball guide 22 and the outlet port 12 gets compressed and exerts a pressure on the ball 54 displacing the ball 54 towards the opening 48 in the second end 44 of the ball guide 22. Positioning the ball 28 on at least a portion of the second opening 36 creates the one or more smaller openings 38 in the second end 32 of the ball cage 20, and defines the one or more passages 40 between the first opening 34 at the first end 30 of the ball cage 20 and the one or more smaller openings 38 at the second end 32 of the ball cage 20. The material entering the pump 10 through the inlet port 16 flows along the one or more passages 40 and through the one or more smaller openings 38 into the section of the pump between the ball cage 20 and the ball guide 22, i.e., into the middle section 24. Concurrently, the material between the second end 44 of the ball guide 22 and the outlet section 14 is pushed out of the pump 10 through the outlet port 12.

In view thereof, modified and/or alternate configurations of the embodiments described herein may become apparent or obvious. All such variations are considered as being within the metes and bounds of the instant disclosure. For instance, while reference may have been made to particular feature(s) and/or function(s), the disclosure is considered to also include embodiments configured for functioning and/or providing functionalities similar to those disclosed herein with reference to the accompanying drawings. Accordingly, the spirit, scope and intent of the instant disclosure is to embrace all such variations. Consequently, the metes and bounds of the disclosure is solely defined by the appended claims and any and all equivalents thereof.

What is claimed is:

1. A pump (10), comprising:
an outlet port (12);
an outlet section (14) in fluid communication with the outlet port;
an inlet port (16);
an inlet section (18) in fluid communication with the inlet port;
a substantially hollow middle section (24) extending between and in fluid communication with the inlet and outlet sections;
a piston (26) configured for rectilinear displacement, the piston comprising spaced-apart opposing first and second ends (92, 94), wherein the first end (92) of the piston is operatively coupled with a prime mover;
a substantially hollow ball guide (22) configured for rectilinear displacement within the pump, the ball guide comprising:
a ball (54) disposed within an interior (52) of the ball guide (22);
spaced-apart opposing first and second ends (42, 44), wherein
the first end (42) of the ball guide is operatively coupled to the second end (94) of the piston; and
the second end (44) of the ball guide comprises:
an opening (48); and
a plurality of spaced-apart posts (46) extending between the first and second ends (42, 44) of the ball guide (22) wherein the posts (46) are spaced so that the ball (54), during operation of the pump, can not move into or out of the ball guide (22) through an opening between two of the posts, and wherein at least one of the posts (46) or the ball (54) is sufficiently flexible or compliant to allow the ball (54) to be manually pushed laterally through the opening between two of the posts into or out of the interior (52) of the ball guide (22) when the pump is not in operation; and
a seat (60) disposed at the second end (44) of the ball guide (22).

2. The pump of claim 1, wherein a displacement of the ball guide in a first direction positions at least a portion of the ball over the opening at the second end of the ball guide and sealingly seats the ball on the seat.

3. The pump of claim 2, wherein the sliding-sealing interface inhibits leakage across the outer perimeter of the second end of the ball guide.

4. The pump of claim 3, wherein the ball is sealingly seated at least in part by one or more of:
at least a partial vacuum between the second end of the ball guide and the inlet port; and
material between the second end of the ball guide and the outlet port.

5. The pump of claim 2, wherein material flows through the inlet port into the pump between the inlet port and the second end of the ball guide; and
at least a portion of material from between the second end of the ball guide and the outlet section flows out of the pump through the outlet port.

6. The pump of claim 1, wherein displacement of the ball guide in a second direction at least partially opens the opening by unseating the ball from the seat and at least partially displacing at least a portion of the ball away from the opening.

7. The pump of claim 6, wherein at least a portion of material from between the inlet port and the second end of the ball guide flows across the at least partially open opening to the outlet section and out of the pump through the outlet port.

8. The pump of claim 1, wherein
displacement of the ball guide in a first direction exerts a first pressure on the ball;
displacement of the ball guide in a second direction exerts a second pressure on the ball;
at least a portion of the ball is positioned over the opening and seated on the seat when the first pressure is relatively greater than the second pressure; and
at least a portion of the ball is unseated from the seat and displaced away from at least a portion of the opening when the second pressure is relatively greater than the first pressure.

9. The pump of claim 8, wherein
flow across the opening is inhibited when at least a portion of the ball is sealingly seated on the entire seat; and
flow across the opening is partially inhibited when a portion of the ball is seated on a portion of the seat.

10. The pump of claim 1, wherein the ball comprises a substantially compliant coating (72) encasing a substantially rigid core (74).

11. The pump of claim 10, wherein
the first end of the ball guide comprises a removable ball stop (56) extending into the hollow of the ball guide; and
opposing sides of at least two adjacent posts (82a, 82b) of the plurality of spaced-apart posts (46) define a contoured opening (86) through which the ball can be displaced into or out of the ball guide after the ball stop has been removed from the ball guide.

12. The pump of claim 10, wherein at least one of the plurality of posts (46) is compliant to enable displacement of the ball into and out of the ball guide.

13. A pump (10), comprising:
an outlet port (12);
an outlet section (14) in fluid communication with the outlet port;
an inlet port (16);
an inlet section (18) in fluid communication with the inlet port;
a substantially hollow middle section (24) extending between and in fluid communication with the inlet and outlet sections;
a ball cage (20) comprising a first ball (28) disposed therewithin;
a substantially hollow ball guide (22) configured for rectilinear displacement within the pump, the ball guide comprising:
a second ball (54) disposed wherein an interior (52) of the ball guide (22);
spaced-apart opposing first and second ends (42, 44), wherein
the first end (42) of the ball guide (22) is operatively coupled to the second end (94) of the piston (26); and
a plurality of spaced-apart posts (46) extending between the first and second ends (42, 44) of the ball guide (22), wherein the posts (46) are spaced so that the second ball (54) can be moved into or out of the ball guide (22) through an opening between two of the posts (46) due to at least one of the posts (46) or the second ball (54) being sufficiently flexible or complaint to allow the second ball (54) to be pushed laterally through the opening between two of the posts into or out of the interior (52) of the ball guide (22) while one or both of the second ball and the at least one of the posts deforms; and
a piston (26) configured for displacing the ball guide (22) towards and away from the ball cage (20).

14. The pump of claim 13, comprising
a first seat (58) disposed at an end of the ball cage (20); and
a second seat (60) disposed at an end of the ball guide (22);
wherein,
the first ball disposed within the ball cage (20) is a first compliant ball;
the ball cage, the first ball disposed therewithin, and the first seat disposed at an end of the ball cage are configured as a check valve;
the second ball disposed within the ball guide (22) is a second compliant ball; and
the ball guide, the second ball disposed therewithin, and the second seat disposed at an end of the ball guide are configured as a check valve.

15. The pump of claim 14, wherein each of the first and second compliant balls disposed within the ball cage and the ball guide, respectively, comprises:
a substantially rigid core (74); and
a compliant coating (72) encasing the rigid core.

* * * * *